United States Patent [19]

Baumann

[11] Patent Number: 5,207,802
[45] Date of Patent: May 4, 1993

[54] SULPHO GROUP-CONTAINING AROMATIC COMPOUNDS, THEIR PRODUCTION AND USE AS DISPERSANTS OR LEVELLING AGENTS IN DYEING TEXTILES OR TANNING LEATHER

[75] Inventor: Hans-Peter Baumann, Ettingen, Switzerland

[73] Assignee: Sandoz Ltd., Basel, Switzerland

[21] Appl. No.: 572,520

[22] Filed: Aug. 23, 1990

[30] Foreign Application Priority Data

Aug. 25, 1989 [DE] Fed. Rep. of Germany ....... 3928170

[51] Int. Cl.$^5$ ..................... C09B 67/38; C08G 10/02; D06P 1/56; D06P 1/62
[52] U.S. Cl. .......................... 8/557; 8/436; 8/524; 8/527; 8/560; 8/588; 8/589; 8/610; 8/94.24; 8/924; 252/8.7; 252/8.6
[58] Field of Search ............... 8/557, 560, 94.24, 589; 252/8.7

[56] References Cited

U.S. PATENT DOCUMENTS

| | | | |
|---|---|---|---|
| 4,202,838 | 5/1980 | Lauton et al. | 8/589 |
| 4,217,103 | 8/1980 | Wolf et al. | 8/664 |
| 4,341,526 | 7/1982 | Kuehni et al. | 8/610 |
| 4,465,492 | 8/1984 | Putzar | 8/589 |

*Primary Examiner*—A. Lionel Clingman
*Attorney, Agent, or Firm*—Gerald D. Sharkin; Richard E. Vila; Thomas C. Doyle

[57] ABSTRACT

Compounds and mixtures of compounds obtainable by condensation of sulphonation products of defined alkyl-substituted naphthalenes and sulphonation products of optionally alkyl-substituted diphenylethers with formaldehye and optionally treated with further components, are valuable interface-active compounds suitable as assistants in various application fields, in particular as dispersing or levelling agents in the dyeing with disperse dyes or as tanning-assistants or dyeing-assistants for leather.

37 Claims, No Drawings

SULPHO GROUP-CONTAINING AROMATIC COMPOUNDS, THEIR PRODUCTION AND USE AS DISPERSANTS OR LEVELLING AGENTS IN DYEING TEXTILES OR TANNING LEATHER

It has been found that sulpho group-containing aromatic compounds obtainable by condensation of sulpho group-containing aromatic compounds (a) and (b), as defined below, with formaldehyde under acidic conditions and optionally salt formation, are valuable interface-active products that are suitable, principally as interface-active assistants, in particular as dispersants, as levelling agents and as tanning assistants for the treatment of corresponding substrates from aqueous medium.

The invention relates to the novel products, their production and use and further to compositions that comprise such products.

The invention thus provides (e) a sulpho group-containing and methylene bridge-containing aromatic compound or mixture of such compounds, obtainable by condensation of (a) a sulphonation product of a compound of formula

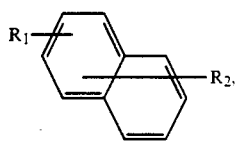

(I)

in which
$R_1$ signifies $C_{1-4}$-alkyl and
$R_2$ signifies hydrogen or $C_{1-4}$-alkyl
and the sum of the number of carbon atoms in $R_1$ and $R_2$ together amounts to at least 2 or a mixture thereof, and (b) a sulphonation product of a compound of formula

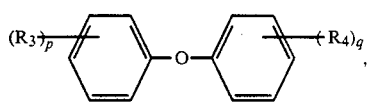

(II)

in which each of $R_3$ and $R_4$ independently signifies $C_{1-4}$-alkyl and each of p and q independently signifies 0, 1 or 2, or a mixture thereof
with
(c) formaldehyde or a formaldehyde-yielding compound
in acidic medium, and optionally salt formation.

As alkyl groups with 1–4 carbon atoms in the significance of $R_1$, $R_2$, $R_3$ and $R_4$ all of the possible representatives come into consideration namely methyl, ethyl, n-propyl, isopropyl, n-butyl, isobutyl, sec.butyl and t.butyl.

The number of the total of carbon atoms in $R_1+R_2$ amounts advantageously at least to 3, in particular at least to 4. Preferably $R_2$ signifies $C_{1-4}$-alkyl. If $R_2$ signifies $C_{1-4}$-alkyl the symbols $R_1$ and $R_2$ may have the same significance or different significances; preferably they have the same significance. Among the alkyl radicals in the significance of $R_1$ an d$R_2$ the higher molecular ones are preferred, in particular $C_{3-4}$-alkyl, namely propyl and butyl of which the branched groups are particularly preferred, before all ispropyl. The alkyl radical $R_1$ may be in any of the positions α and β; if $R_2$ signifies $C_{1-4}$-alkyl also this radical may be in any of the positions α ad β, or α' and β'. Among the dialkyl substituted naphthalenes of formula (I) all possible positional isomers come into consideration, in particular the corresponding 1,3-, 1,4-, 1,5-, 1,6-, 1,7-, 2,6- and 2,7-dialkyl substituted naphthalenes. There may be employed single compounds or mixtures advantageously technical isomeric mixtures.

Among the alkyl radicals in the significance of $R_3$ and $R_4$ the lower molecular representatives are preferred namely ethyl and in particular methyl. If p and/or q signify 1 or 2 the respective alkyl groups may be in any of the positions ortho, meta and para to the oxygen atom. As monosubstituted diphenylethers in which only one of p an dq is 1, the other signifying 0, there may be mentioned the corresponding 2-, 3- or 4-alkyldiphenylethers mainly the 2-, 3- or 4-methyldiphenylether and further technical mixtures of these compounds. Of the compounds in which each of p and q signifies 1 there may be mentioned the single positional isomers 2,2', 2,3', 2,4', 3,3', 3,4' and 4,4' as well as mixtures, in particular technical mixtures of such isomers; among these ditolylether and ditolylether mixtures, in particular technical ditolylether mixtures, are preferred. If p or q signifies 2 the two alkyl radicals may have different significances or preferably the same significance and may be in any two positions of the phenyl radical (2,3; 2,4; 2,5; 2,6; 3,4; 3,5). Particularly worth mention are the corresponding dixylylethers and dixylylether mixtures, in particular technical dixylylether mixtures. Also the mixed ethers are worth mention, in particular phenyl-tolyl-ether, phenyl-xylyl-ether and tolyl-xylyl-ether. Of the mentioned ethers those in which p=0 or 1 and q=0 or 1, in particular p=1 and q=1, are preferred, principally diphenyl-ether and in particular ditolylether.

Components (a) and (b) are obtainable by solphonation of the corresponding compounds of formulae (I) and (II) for which the compounds of formulae (I) and (II) may be sulphonated either each separately or together in admixture with each other. The solphonation of the compounds of formulae (I) and (II) may take place under conventional sulphonation conditions, e.g. employing oleum, 100% sulphuric acid, concentrated sulphuric acid or chloro-sulphonic acid. The sulphonation may e.g. be carried out in the temperature range from room temperature (=20° C.) to 150° C., preferably 70°–135° C. In the sulphonation with 100% or concentrated sulphuric acid the conditions may, if desired, be chosen so that reaction water is eliminated (e.g. distilled or evaporated, optionally under reduced pressure). Suitably the sulphonation is carried out under such condition that per molecule of formula (I) and/or (II) there are introduced on average 0.7 to 2, preferably 0.8 to 1.2 sulpho groups, advantageously employing 0.9 to 2.5 moles, preferably 1.2 to 1.8 moles of the sulphonation agents per mole of starting material of formula (I) or (II) or of the mixture of the starting materials of formulae (I) and (II). An alkylation of naphthalene with alcohols $R_1$—OH resp. $R_2$—OH and/or of diphenylether with alcohols $R_3$—OH resp. $R_4$—OH to corresponding compounds of formula (I) resp. (II) may optionally be carried out together with the sulphonation in the same sulphonation medium.

The sulphonation products (a) may be represented by the following average formula

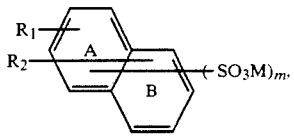

in which m signifies 0.7 to 2 and

M signifies hydrogen or a cation.

The sulphonation products (b) may be represented by the following average formula

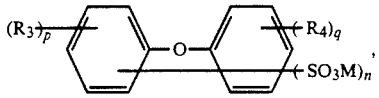

in which n signifies 0.7 to 2.

In formula (Ia) each of the rings A and B contains advantageously not more than one sulpho group. In formula (IIa) each of the benzene rings contains advantageously not more than one sulpho group.

The indexes m and n represent the degree of sulphonation indicated above and are preferably each in the range of 0.8 to 1.2. The sulphonation is advantageously carried out so that a degree of sulphonation as unitary as possible is achieved, with m resp. n = 0.8 to 1.2 in particular so that at least 50 mol %, preferably at least 80 mol % of the products are monosulphonated. The compounds of formula (I) and (II) may be sulphonated separately or advantageously also together in one reaction mixture.

The sulphonation products (a) and (b) resp. the compounds of formula (Ia) and (IIa) are preferably employed in the form of the free acids (i.e. wherein M signifies hydrogen) since the reaction with formaldehyde takes place under acidic conditions.

The products (a) and (b) resp. the compounds of formuale (I) and (II) are advantageously employed in a molar ratio (a)/(b) resp. (I)/(II) in the range of 10:90 to 80:20, preferably 20:80 to 70:30, in particular 40:60 to 60:40.

As component (c) there may be employed free formaldehyde or a formaldehyde-yielding compound, e.g. paraformaldehyde. The molar ratio of the total of components [(a)+(b)] to (c) is advantageously chosen so that there are formed simple to oligomeric condensation products. In these condensation products the respective radicals of the sulphonation products (a) and/or (b), in particular those of the compounds of formulae (Ia) resp. (Ia), are linked to each other essentially over aromatically bound methylene bridges.

The products of the invention may essentially be represented as such that contain one or more repeating units of the respective average formula

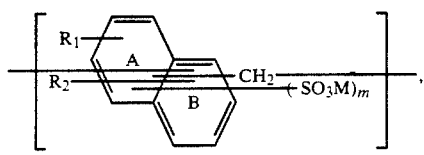

and/or

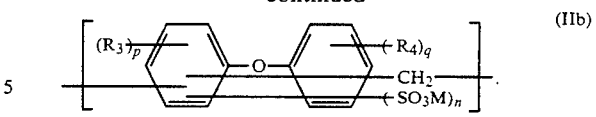

Analogously as in formula (Ia), formula (Ib) contains advantageously not more than one sulpho group at each of the rings A and B of the naphthalene nucleus; in formula (IIb) there is —analogously to formula (IIa-)—advantageously not more than one sulpho group at each of the benzene rings. In formulae (Ib) and (IIb) the free bond shown without any substituent and pendant at the aromatic nucleus is either linked over a methylene bridge to a further aromatic radical (Ib) or (IIb) or [if (Ib) or (IIb) represent a terminal group ] is linked directly to a hydrogen atom.

The open bond pendant at the methylene group is linked t the aromatic nucleus of a further radical of formula (Ib) or (IIb).

The molar ratio [(a)+(b)] to (c) is advantageously chosen so that per mole of [(a)+(b)] there are employed 0.25 to 1.1 moles, preferably 0.35 to 0.8 moles of formaldehyde, or the corresponding amount of a formaldehyde-yielding compound.

The reaction with (c) takes advantageously in the range of 50°–110° C. in strongly acidic medium, e.g. at pH-values <3, preferably below 1. With particular advantage this reaction is carried out sequentially to the sulphonation in the sulphuric acid containing acidic medium. Preferably the reaction with (c) takes place in aqueous acidic medium, for which component (c) may be added in hydrodiluted form and/or the sulphuric reaction medium resulting from sulphonation may be diluted with water up to a water content of advantageously 10–50%.

After conclusion of the reaction the obtained products [in which in particular in the formulae (Ib) and (IIb) M signifies hydrogen] may be converted to the corresponding slat form, in particular in which in formulae (Ib) and (IIb) M signifies a cation, by reaction with a suitable base or a salt of a strong base with a weak acid. Cations M include principally colourless cations, preferably alkali metal cations (in particular lithium, sodium, potassium) alkaline earth metal cations (in particular magnesium) and/or ammonium cations (in particular unsubstituted ammonium, morpholinium or ammonium substituted with $C_{1-2}$-alkyl and/or $C_{2-3}$-hydr-oxyalkyl, e.g. mono-, di- or triethanolammonium or mono-, di- or triiso-propanolammonium) which may be introduced by treatment of the sulphonic acids with corresponding bases or their salts of weak acids, e.g. with alkali metal hydroxides, carbonates or bicarbonates, magnesium hydroxide, ammonia or corresponding amines. Particularly worth mention are further the salts ($e_1$) of bivalent transition metals of the fourth row (period) of the periodic system of elements, which are, in particular capable of complex formation, advantageously $Mn^{++}$, $Co^{++}$, $Ni^{++}$ and/or $Cu^{++}$ of which $Cu^{++}$ is preferred, preferably in combination with ammonia and/or amines (resp. their cations) —in particular the ones mentioned above. These salts ($e_1$) may e.g. be produced by treating the sulphonic acids [before or after the condensation with c)] with the corresponding metal oxides, hydroxides or salts, e.g. salts of carboxylic or mineral acids, in particular chlorides, sulphates, carbonates or basic salts [e.g. CuO, $CuSO_4.5H_2O$, $CuCl_2.2$-

$H_2O$, $CuCO_3.Cu(OH_2$, NiO, $NiSO_4.6H_2O$, $MnSO_4.7H_2CoSO_4.7H_2O$] advantageously at temperatures in the range of 60°–110° C., preferably 80°–105° C., after which the reaction product is treated preferably with ammonia and/or amine, advantageously at temperatures in the range of 10°–70° C., preferably 15°–40° C., or the condensation products preferably in the form of their ammonium slats (from the reaction with ammonia and/or amine) and in aqueous solution are treated with a corresponding transistion metal compound, preferably a mineral salt. Advantageously there is employed so much assonia and/or amine that the pH of the aqueous composition is in the range of 7–10, preferably 7.5–9. Per val of sulphonic acid (1 val of sulphonic acid = 1 mol of the sulphonic acid divided by the number of sulphonic acid groups in the molecule) there are employed advantageously 0.01–1.0 val, preferably 0.1–0.8 val of transition metal compound or cation (1 val of transition metal compound = 1 mol of the compound divided by the total of transition metal valencies in the molecule).

The obtained products (e) are —in particular in salt form —readily soluble in water and may be handled so as produced, optionally after adjusting the water content to a dry substance content of e.g. 10–70% by weight or they may, if desired be dried to give dry compositions, e.g. by pulverizing or granulating (e.g. with addition of granulating assistants).

If desired, e.g. in order to facilitate practical application, the solutions may be treated with organic solvents, advantageously alcohols, principally aliphatic $C_{2-8}$-alcohols (in particular ethanol, propanol and mono- or diethyleneglycol and their $C_{1-4}$-alkyl-monoethers, e.g. butyl-glycol). Preferably there are however employed no such solvents.

The products (e) of the invention have interface-active—in particular dispersing, wetting and levelling—properties and serve as hydrophilic interface active assistants, principally in processes that are carried out in aqueous medium, in aqueous compositions and in dry compositions that find their use in aqueous medium. They serve preferably as assistants in the dyeing and/or optical brightening of various substrates, particularly of fibrous material [e.g. natural, semi-synthetic or fully synthetic fibrous material, in particular natural or regenerated cellulose (e.g. cotton, lient, jute, hemp, cellulose acettes and viscose) natural or syntheic polyamides (e.g. wool, silk, synthetic polyamides), polyesters, polyuretahnes, polyalkylenes (e.g. polypropylene), polyacryloniriles and leather ] where they act mainly as dispersing agents of distinct wetting activity and/or as levelling agents, or even as tanning assistants for leather where they are employed, e.g. as syntans of dispersant character. They may advantageously be used as additives for dyestuff compositions, e.g. dry compositions or concentrated liquid compositions of anionic, amphoteric or non-ionic dyes —e.g. such as defined in the "Colour Index" under the headings: Acid Dyes, Reactive Dyes mordant Dyes, Leather Dyes. Vat Dyes, Sulphur Dyes, Solubilized Sulphur Dyes, Condense Sulphur Dyes, Pigments and Disperse Dyes —or even for optical brighteners (anionic or disperse optical brighteners). With particular advantage the products (e) of the invention are employed in the form of the free acids and/or preferably as salts ($e_2$) of colourless cations (in particular as described above for M) as dispersing agents for (d) disperse dyes and/or disperse optical brighteners. In dyestuff and optical brightener compositions the interface active products (e) may be employed in such concentrations as conventional for dispersants, e.g. 5–400% by weight, referred to the pure dye or optical brightener. For optical brighteners and for hydrosoluble dyes there are employed advantageously 5–50% by wight of the dispersant, whereas for disperse dyes there may be employed in general higher weight ratios, in particular 100–400% by weight, preferably 120–300% by weight, referred to the dye. As dispersing agents the products (e) of the invention are advantageously employed together with the dye and/or optical brightener. The products (e) of the invention serve also as levelling agents in the dyeing and may thus also be added separately into the aqueous liquor. Where added separately (or in admixture with a carrier) into the liquor they are employed advantageously in concentrations of 0.2–10 g/l, preferably 0.5–4 g/l. They may be employed as sole dispersing and/or levelling agents or may, if desired, also be combined with further conventional non-ionic (f) or anionic (g) dispersing and/or levelling agents or even be blended therewith (weight ratio of product (e) to further dispersing agent and/or levelling agent (f) and/or (g), e.g. 9:1 to 1:9, preferably 5:5 to 9:1.

Non-ionic assistants (f) with levelling and/or dispersing character that may be used together with the product of the invention, include non-ionic emulsifiers, principally oxyethylation products of higher fatty alcohols, fatty acids or fatty acid amides of partially esterified polyols, e.g. of glycerine or sorbitaol mono- or diesters of higher fatty acids, or of tri-glcerides of higher fatty acids containing at leas tone hydroxy group. The fatty radicals contain preferably 12–24 carbon atoms. The degree of oxyethylation is advantageously in the range of 5–70.

As further dispersing agents that may be used together with the products of the invention there are employed advantageously (g), principally anionic dispersing agents, in particular sulpho group-containing dispersants, preferably lining sulphonates, fatty sulphonates and condensation products of optionally alkyl substituted sulphonated aromatic compounds with formaldehyde, e.g. of naphthalene sulphoneic acid and formaldehyde, and further sulpho group-containing aromatic mono- or polysulphones, higher molecular fatty alcohol sulphates, e.g. sodium dodecylsulphate) mono- or dialkylsulphosuccinates (e.g. dioctylsodiumsulphosuccinate) and aliphatic hydrocarbon sulphonates (e.g. petroleum sulphonate and secondary $C_{13-17}$-alkyl sulphonates); of these the lining sulphonates, the condensation products of optionally alkyl substituted aromatic sulphonic acids with formaldehyde and the sulphonated fats (principally sulphonated triglycerides of at least partially unsaturated and/or hydroxy group-containing fatty acids) are particularly preferred.

Suitable additives and blending agents may be optimally chosen, depending on the active substance and application method.

Disperse dye compositions of the specified kind are suitable for the treatment of corresponding textile or non-textile substrates, in particular fibrous material of semisynthetic or fully synthetic materials, e.g. of regenerated cellulose (viscose, cellulose acetates) polyamide, polyuretahne and in particular polyester and their mixture with each other or with natural fibres (e.g. polyester/cotton) as conventionally employed for the dyeing with disperse dyes or the optical brightening with disperse optical brighteners.

The products (e) of the invention serve in particular also as assistants for the treatment of leather from aqueous medium in various processing stages, e.g. in tanning (as tanning assistants), in re-tanning as sole syntans or also as tanning assistants in combination with other tanning or retanning agents (e.g. vegetable, mineral and/or synthetic tanning agents) or with filling agents, or for the emulsification of aft-liquo-ring agents in fat-liquor compositions (e.g. with natural, optionally modified and/or with synthetic fat-liquoring agents) and as dyeing assistants before, during or after the dyeing. For this latter purpose any conventional dyes are suitable, in particular hydrosoluble anionic and/or cationic dyes. Referred to the wet weight of the leather the products of the invention are advantageously employed in concentrations of 0.2–6% by weight, preferably 1–4% by weight. Application on leather may advantageously be carried out under weakly basic to clearly acidic conditions, preferably at pH-values in the range of 3–8, in particular 4–6.5, and at conventional leather treatment temperatures, principally 25°–75° C.

The products (e) of the invention are also suitable as dispersing agents in the secondary oil recovery, in the production of dispersed or dispersible agricultural or building chemicals, as assistants in paper industry, e.g. in the working of grey paper (for pulping or de-inking), or also in detergents.

In the form of their reaction products ($e_1$) with bivalent transition metals of the fourth row and preferably with ammonia and/or amines as described above the condensation products of the invention are also useful as dyeing assistants, in particular for textile material, paper or leather, in order to achieve an improvement of fastnesses, especially light-fastness of dyeings with anionic dyes (e.g. on synthetic polyamide, in particular for textiles for automotive upholstery). For this purpose there re advantageously employed in concentrations of 0.01 to 3% by weight, referred to the weight of the substrate. When impregnating wood (against decomposition due to light and weather influence and as fungicide) there are advantageously employed larger amounts of the transition metal derivatives, preferably copper derivates (in particular 1–5% by weight). They are also well compatible with UV-stabilizers and optical brighteners.

On textile material and paper the products (e) of the invention, in particular the above-described transition metal derivatives ($e_1$) may advantageously be also applied together with optical brighteners and/or UV-stabilizers and a further objection of the invention is the combines application of the products (e), in particular of the above stated transition metal derivatives ($e_1$), together with UV-stabilizers, and compositions comprising both.

Any conventional UV-stabilizers, in particular such as described in EP 255 481 A, mainly such of the benzophenone series, of the oxalic acid dianilide series, of the 2,2,6,6-tetraalkylpiperidien series or of the benzotriazol series, especially as described in GB 1 234 128 A, GB 1 362 957 A, GB 1 474 281 A, GB 1 474 282 A, 2 000 512 A, GB 2 085 001 A, GB 2 091 732 A and CHP 496 060, all of which are incorporated herein by reference, may be employed. Of the mentioned UV-stabilizers the UV-absorbers, particularly those of the 2-(2'-hydroxyphenyl)-benzo-v-triazole series - especially 2-(2'-hydroxyphenyl)-benzo-v-triazole that is substituted at the 2-positioned phenyl, besides the hydroxy group, optionally by one or two $C_{1-4}$-alkyl groups and at the benzo-ring optionally by one chlorine - in particular as describe din GB 2 187 746 A, are preferred. The UV-stabilizers may be employed in the form of conventional commercial aqueous compositions and may be admixed, e.g. by stirring at room temperature with the products of the invention (optionally diluted, e.g. in the form of solutions, as described above). Advantageously there are employed 0.3–10, preferably 0.7–5 parts by weight of UV-stabilizers (calculated as dry substance) per part by weight of (e), in particular ($e_1$), (calculated as dry substance). Particularly advantageous are mixtures of UV-stabilizer and transition metal derivatives ($e_1$) in the weight ratio of 30–80% by weight of UV-stabilizer to 70–20% by weight of ($e_1$), preferably 50–80% by weight of UV-stabilizer to 50–20% b weight of ($e_1$). By addition of the UV-stabilizer there may be achieved even with minor amounts of transition metal derivative ($e_1$)—preferably 0.002 to 1% by weight referred to the weight of the substrate —there may be achieved excellent results, in particular in the light-fastness improvement. The products (e) of the invention, in particular the transition metal derivatives ($e_1$) stated above, are conveniently formulated together into aqueous compositions. These compositions comprise a product of the invention or a mixture thereof and a UV-stabilizer or a mixture thereof, together with water and any eventual byproducts from their production and optionally further additives (in particular surfactants and/or further solvents, as described above) and preferably consist essentially thereof. The total content of product of the invention and UV-stabilizer in these compositions is advantageously in the range of 15–50, preferably 20–40% by weight.

The products (e) of the invention cause practically no greying or dark soiling of the treated substrates, which is of particular advantage for white goods and goods dyed in brilliant shades and/or pastel shades. Despite their distinct dispersant character, they do not favour the formation of foam —in particular in aqueous medium as customarily employed for practical purposes. Aqueous compositions containing the products (e) of the invention are distinguished by their stability and poor formability, even at elevated temperatures and strong dynamic stress of the liquors and are consequently particularly suitable for all those applications in which the formation of high foam volumes is into desired, particularly in dyeing processes and finishing processes in which the goods to be treated and the liquor are subjected to a strong dynamic stress, e.g. for the dyeing in dye-jet machines in which vats, in jiggers and in drums or for the dyeing of cross-spooled bobbins. They are further distinguished by their high dispersing activity by which the active substance (e.g. the dye, the optical brightener or other finishing agent) is dispersed in the liquor in finely divided form for the whole duration of the treatment-process so long as it is still present in the liquor, so that agglomerations and deposits on the assembly or on the substrates may be efficiently avoided nd the build-up and efficiency of the active substance are practically not impaired. If retarding surfactants are added also their effect is practically not impaired.

In the following examples parts and percentages are by weight; the temperatures are indicated in degrees Celsius; the employed diisopropylnaphthalene is a commercial isomeric mixture (KMC of Rutgers Werke A.G., Duisburg, Germany) containing the positional isomers 1,3,1,4,1,5,1,6, 1,7,2,6 and 2,7, and the ditolylether is also a commercial isomeric mixture containing the positional isomers 2,2', 2,3', 2,4', 3,4' and 4,4'In the Application Examples the percentages are referred to the substrate if there is not clearly intended a concentration of a solution or dispersion.

EXAMPLE 1 a) 147 parts of 100% sulfuric acid are added during 25 minutes at 75° C. under a nitrogen blanket into a mixture of 106 parts of diisopropyl-naphthalene and 99 parts of ditolylether by which the temperature raises to 80°-85° C. The reaction mixture is then heated to 105° C. and stirring is continued until a sample is hydrosoluble, which takes place after about 2 hours. Thereafter the reaction mixture is cooled to 80° C. and 43 parts of aqueous 37% formaldehyde are added thereto during 15 minutes, the temperature being maintained at 25° C. by external cooling. After completion of the addition 25 parts of water are added thereto and the mixture is heated to an inner temperature of 95°-97° C. and stirring is continued until the reaction of formaldehyde has completed which lasts about 2 hours. After cooling the reaction mixture to 80° C. 275 parts of water/ice-mixture are added and the reaction mixture is cooled to 30° C. 157 parts of aqueous 25% ammonia are added (pH=7.5-8) and finally 231 parts of demineralized water are stirred into the mixture. There are obtained 1083 parts of dispersant solution.

b) By evaporation in the spray direr of the 1083 parts of dispersant solution obtained according to above Example 1a) there are obtained 374 parts of dry dispersant in the form of powder.

EXAMPLES 2-9

Analogously as described in the above Example 1 further products (e) of the invention are obtained by employing the reactants and molar ratios thereof indicated in the following table.

EXAMPLE 11

147 parts of 100% sulphuric acid are added during 25 minutes at 75° C. under a nitrogen blanket into a mixture of 106 parts of diisopropylnaphthalene and 99 parts of ditolylether by which the temperature raises to 80°-85° C. The reaction mixture is then heated to 105° C. and stirring is continued until a sample is hydrosoluble, which takes place after about 2 hours. 12 parts of copper oxide are then added at 95°-100° C., by which the temperature may raise to 105°-110° C., and stirring is continued for further 30 minutes. The reaction mixture is then cooled to 80° C. and 43 parts of aqueous 37% formaldehyde are added thereto during 15 minutes, the temperature being maintained at 25° C. by external cooling. After completion of the addition 25 parts of water are added into the reaction mixture which is then heated to an inner temperature of 95°-97° C. and stirred until the formaldehyde reaction has completed, which lasts about 2 hours. Then the reaction mixture is cooled to 80° C. and 275 parts of water/ice-mixture are added and the mixture is cooled to 30° C. At this temperature 157 parts of aqueous 25% ammonia are slowly added (pH=7.5-8) and finally 231 parts of demineralized water are stirred into the mixture.

EXAMPLES 11a to 11h

The procedure described in Example 11 is repeated with the difference that in place of the there employed reactants —with the exception of copper oxide —those of Examples 2-9 respectively are employed and coppering is carried out as described in Example 11 with copperoxide.

FORMULATION EXAMPLE A 214 parts of the dye C.I. Index Disperse Blue 73 in the form of wet press-cake (from production, further con-

| Ex. Nr. | Diisopropyl-naphthalene Mols | Ditolylether Mols | Diphenylether Mols | $H_2SO_4$ Mols | Formaldehyde Mols | Base for salt formation pH 7,5-8 |
| --- | --- | --- | --- | --- | --- | --- |
| 2 | 0,25 | 0,75 | — | 1,5 | 0,35 | $NH_4OH$ |
| 3 | 0,25 | 0,75 | — | 1,5 | 1,00 | $NH_4OH$ |
| 4 | 0,5 | 0,5 | — | 1,5 | 0,35 | $NH_4OH$ |
| 5 | 0,5 | 0,5 | — | 1,5 | 0,8 | $NH_4OH$ |
| 6 | 0,5 | — | 0,5 | 1,0 | 0,35 | $H_2NCH_2CH_2OH$ |
| 7 | 0,5 | 0,5 | — | 1,5 | 0,5 | $Mg(OH)_2$ |
| 8 | 0,75 | 0,25 | — | 1,5 | 0,35 | $NH_4OH$ |
| 9 | 0,3 | 0,4 | 0,3 | 2,0 | 0,5 | $NH_4OH$ |

EXAMPLE 10

30 parts of the powder obtained according to Example 1b) are dissolved with 35 parts of demineralized water (=Solution 1).

7.9 parts of copper sulphate pentahydrate are dissolved in 22.1 parts of demineralized water (=Solution 2).

65 parts of Solution 1 and 30 parts of Solution 2 are admixed and treated with further 5 parts of demineralized water. The obtained product contains about 2% $Cu^{2+}$.

EXAMPLES 10a TO 10H

The procedure of Example 10 is repeated with the difference that in place of the product of Example 1b) there are employed the respective products of Examples 2b) to 9b).

taining 900 parts of water) are admixed with 1050 parts of the dispersant solution according to Example 1a) with good stirring during 16 hours until a lump-free suspension results. This is passed through a sieve of 950 meshes per cm² and then homogenized for 2 hours in a homogenizer until the size of most of the particles is at 1 μ or below. The homogenized product is then spray-dried. There are obtained 725 parts of a dye-powder that displays a very good stability of the dispersion in all conventional application fields of a disperse dye and whose colour yield in textile dyeing procedures is excellent. With a solution of the powder according to Example 1b) there is obtained also a dye composition with outstanding dispersing behaviour.

FORMULATION EXAMPLE B 34 parts of a powder of the dye C.I. Disperse Blue 71 are homogeneously admixed with stirring with 10 parts of the composition according to Example 1a) or 10 part of an aqueous 30% solution of the product according to Example 1b), the mixture is then precomminuted by means of a Rotor-Sator sprocket colloidal mil and then further comminuted during 50 minutes in a high-speed stirred ball-mill filled with glass-pellets of granule size of 0.400.6 mm. The obtained suspension displays a good storage stability and good applicatory properties.

FORMULATION EXAMPLE C

The herbicide "Diuron" is milled in a jet-mill to a composition with the following components: 80% active substance, 5% dispersant according to Example 1b) ($NH_4$-salt 100%), 1.5% dibutylnaphtahlene sulfonate, 4% "Silkasil" S and 9.5% clay.

COMPOSITION I 50 parts of the aqueous product of Example 10 are admixed with stirring at room temperature (=20° C.) with 50 parts of an aqueous 25% dispersion of the UV-stabilizer of the formula

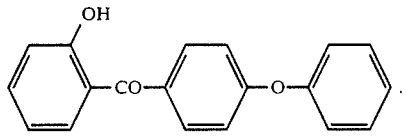
(1)

COMPOSITION II 50 parts of the aqueous product of Example 10 are admixed with stirring at room temperature with 50 parts of an aqueous 30% dispersion of the UV-stabilizer of formula

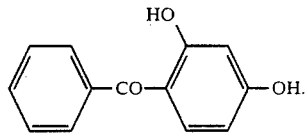
(2)

COMPOSITION III 50 parts of the aqueous product of Example 10 are admixed with stirring at room temperature with 50 parts of an aqueous 30% dispersion of the UV-stabilizer of formula

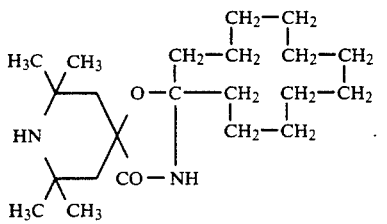
(3)

COMPOSITION IV 30 parts of the aqueous product of Example 10 are admixed with stirring at room temperature with 70 parts of an aqueous 25% dispersion of the UV-staiblizer of formula

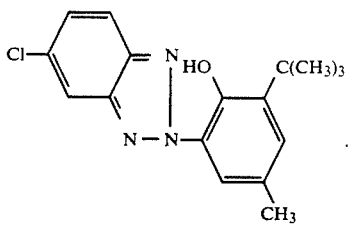
(4)

COMPOSITION V 50 parts of the aqueous product of Example 10 are admixed with stirring at room temperature with 50 parts of an aqueous 25% dispersion of a mixture of the UV-stabilizers of the formulae (3) and (4) in even parts.

COMPOSITION VI 30 parts of the aqueous product of Example 10 are admixed with stirring at room temperature with 70 parts of an aqueous 30% dispersion of the UV-stabilizer of the formula

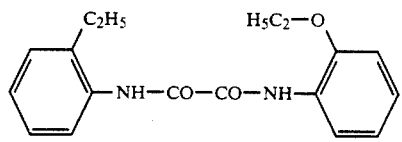
(5)

Analogously as the product of Example 10 the products of the Examples 10a to 11h are admixed as in the Compositions I to VI with the there employed UV-stabilizers to corresponding compositions.

APPLICATION EXAMPLE 1

Spools of texturized polyester yarns are dyed in an HT-dyeing machine by forcing through the spools at a liquor-to-goods ratio of 10:1 and at 130° C., a dyeing liquor composed of demineralized water (pH 4.5 adjusted with acetic acid), 1.5 g/l of the product obtained according to Example 1b), 0.5 g/l of the addition product of 30 moles of ethyleneoxide to 1 mole of castor oil and the following dyes:
1) 0.46% of the dye of formula

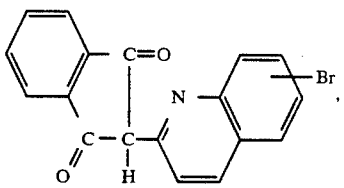
(α)

2) 0.52% of the dye of formula

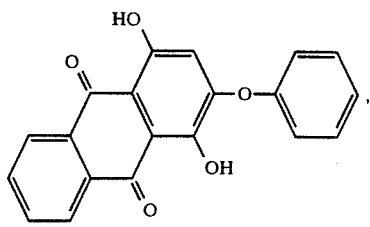
(β)

3) 0.17% of the mixture of dyes of formulae (y1) and (y2) (in even parts)

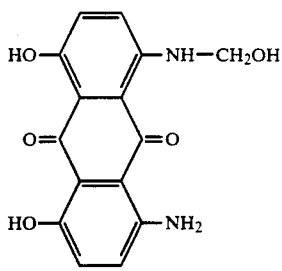
(γ1)

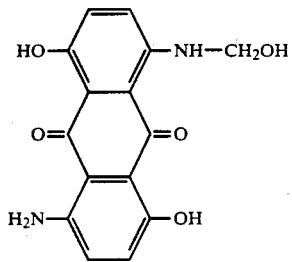
(γ2)

The rate of the liquor forced through the spools is of 20 l/kg per min. After 30 minutes of treatment at 130° C. the liquor is cooled, drained off and the dyeings are purified reductivley. There is obtained a completely level brown dyeing of full colour yield. During the dyeing foam formation is minimal.

In alalogous way in Application Example 1 there are employed 3.2 g/l of the dye-composition according to Formulation Example A or 2.3 g/l of the dye-composition according to Formulation Example B in place of the 1.5 g/l of dispersant according to Example 1b) and the employe dye-mixture. There are obtained level blue dyeings of full colour yield.

APPLICATION EXAMPLE 2

A polyester fabric (type Dacron) is dyed at a liquor-to-goods ratio of 20:1 with 0.5%% of the dye Foron Rubin SE-GFL with addition of 2 g/l of ammonium sulphate and 2 g/l of the product of Example 1b) at pH 5.0 (adjusted with formic acid). Dyeing is begun at 20° C.; the dye bath is heated during 10 minutes at 70° C. The dyeing is completed after 20 minutes at 130° C. There is obtained a level dyed fabric.

APPLICATION EXAMPLE 3

The procedure described in Application Example 2 is repeated with the difference that in place of the 0.5% dye and 2 g/l of the product of Example 1b) there are employed 2.5% of the dye composition according to Formulation Example A. There is obtained a level blue dyeing of optimum colour-yield and fastness.

APPLICATION EXAMPLE 4

A polyester fabric (type Dacron) is dyed in a dye-jet (Labor-Jet of the firm MATHIS) with the dye liquor as employed in Application Example 3, at a liquor-to-goods ratio of 20:1 and a dye liquor rate of 60 l/min. (2 hours from 60° C. to 126° C., 30 minutes at 126° C. and 30 minutes from 126° C. to 60° C.). There is obtained a level blue dyeing in optimum colour yield and fastness. During the dyeing foam formation is minimal.

Analogously as the dye composition according to formulation Example A the dye composition according to Formualtion Example B may be employed in the above Application Examples in corresponding amounts.

APPLICATION EXAMPLE 5

(The percentages referred to the substrate refer to the wet-weight of the leather).

Chrome-tanned cow-leather (wet-blue of 1.5 mm thickness) are neutralized in the re-tanning drum with 200% of water, 2% of a phenolic syntan (sodium salt) and 0.5% of sodium bicarboante at 30° C. during 30 minutes, then the bath is drained-off and re-tanning is carried out in a fresh bath with 200% of water, 4% of phenolic polysulphone syntan, 3% of a hydrosoluble condensate of formaldehyde and melamine (filling/re-tanning agent) and 3% mimosa extract at 30° C. for 45 minutes. 0.5% of 85% formic acid diluted 1:5 are then added and treatment is continued for 10 minutes and then the bath drained off. In a fresh bath the leather is treated with 200% of water and 2% of the product according to Example 1b) during 30 minutes at 30° C. and then liquor is drained off, the leather is washed with 300% of water at 30° C. and the liquor is drained off. 200% of water at 50° C. and 0.6% of the dye C.I. Acid Brown 276 (concentration referred t the pure dye) are added and after 15 minutes there is added a fat-liquoring mixture of 2% of 80% sulphited fish-oil and 2% partially methol-esterified vegetable fatty acids and treatment is continued for 45 minutes. 1.5% of formic acid (85%) are then added and after 30 minutes of drumming the liquor is drained off. After washing with 300% of cold water and draining off of the liquor the leather is discharged, drained, dried nd mechanically finished. There is obtained a level brown dyeing.

APPLICATION EXAMPLE 6

(The percentages referred to the substrate refer to the wet-weight of the leather)

Chrome-tanned cow-leather (wet-blue pf 1.5 mm thickness) are neutralized in the retanning drum with 200% of water, 2% of a phenolic syntan (sodium salt) and 0.5% of sodium bicarbonate during 30 minutes at 30° C., then the bath is drained off and in a fresh bath retanning is carried out with 200% of water, 4% of phenolic polysulphone syntan, 3% of a hydrosoluble condensate of formaldehyde and melamine (filling/re-tanning agent) 2% of the product according to Example 1b) and 3% of mimosa extract at 30° C. during 45 minutes. 0.5% of formic acid (85% diluted 1:5 are then added and drumming is continued for 10 minutes and then the bath is drained off. In a fresh bath the leather is treated with 200% of water and 2% of the product according to Example 1b) during 30 minutes, upon which the liquor is drained off, the leather is washed with 300% of water at 30° C. and the bath is drained off. 200% of water at 50° C. and 0.6% of the dye C.I. Acid Brown 276 (concentration referred to the pure dye) are then added and after 15 minutes there is added a fat-liquor mixture of 2% of 80% sulphited fish-oiland 2% partially methyl-esterified vegetable fatty acids and treatment is continued for 45 minutes. 1.5% of formic acid (85% are then added and after 30 minutes of drumming the liquor is drained off. After washing with 300% of cold water the bath is drained off and the leather discharged, drained, dried and mechanically finished. There is obtained a well filled leather dyed in a brown shade.

Analogously as the product of Example 1 the products of each of Examples 2-9 are employed in the above Formulation Examples and Application Examples.

APPLICATION EXAMPLE 7

A nylon-6-fabric is dyed for 1 hour at 98° C. by the exhaust method at a liquor-to-goods ratio of 20:1 in aqueous liquor containing 0.3% of C.I. Acid Blue 280 (commercial product), 2% ammonium sulphate and either 0.5% or 1.0% of the aqueous composition according to Example 10, the pH being adjusted to 6 with acetic acid, and is then rinsed with water and dried. The obtained dyeing show a notably improved light-fastness in comparison to those dyed in the same way but without the assistant according to Example 10.

APPLICATION EXAMPLE 8

Analogously as described in Application Example 7 the assistant according to Example 10 is employed in the dyeing of a Nylon-66-fabric with a dye mixture of 0.01% of C.I. Acid Yellow 235, 0.006% of C.I. Acid Red 217 and pb 0.046% of C.I. Acid Black 218.

APPLICATION EXAMPLE 9

The procedure described in Application Example 7 is repeated with the difference that in place of 0.3% of C.I. Acid Blue 280 there are employed 0.5% of C.I. Acid black 58. The obtained dyeing are distinguished by an improved light-fastness over the corresponding dyeing produced without the assistant.

According to the above Application Examples 7, 8 and 9 there are also employed the products according to Examples 10a to 11h.

APPLICATION EXAMPLE 10

The procedure described in Application Example 7 is repeated with the difference that in place of the product according to Example 10 there is employed the same amount of Composition I. The obtained dyeing is distinguished by its light-fastness (even under elevated temperature).

APPLICATION EXAMPLE 11

The procedure described in Application Example 8 is repeated with the difference that in place of the product of Example 10 there is employed the same amount of Composition I. The obtained dyeing is distinguished by its light-fastness (even under elevated temperature).

APPLICATION EXAMPLE 12

The procedure described in Application Example 9 is repeated with the difference that in place of the product of Example 10 there is employed the same amount of Composition I. The obtained dyeing is distinguished by its light-fastness (even under elevated temperature).

In the same way as composition I compositions, II, III, IV, V and VI are employed in the above Application Examples 10, 11 and 12.

I claim:

1. A methylene bridge and sulpho group-containing aromatic compound (e) or mixture of compounds (e) obtainable by condensation of (a) a sulphonation product of a compound of formula

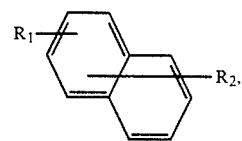

wherein
   $R_1$ signifies $C_{1-4}$-alkyl and
   $R_2$ signifies hydrogen or $C_{1-4}$-alkyl
   and the sum of the number of carbon atoms in $R_1$ and $R_2$ together amounts to a least 2 or a mixture thereof, and (b) a sulphonation product of a compound of formula

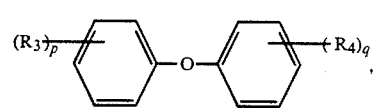

wherein
   each of $R_3$ and $R_4$ independently signifies $C_{1-4}$-alkyl and
   each of p and q independently signifies 0,1 or 2
   or a mixture thereof with (c) formaldehyde or a formaldehyde-yielding compound in an acidic medium,
   and optionally salt formation.

2. A compound (e) or mixture thereof according to claim 1 wherein (a) and (b) are employed in a molar ratio (a):(b) in the range of 1:9 to 8:2.

3. A compound (e) or mixture thereof according to claim 1 wherein the degree of sulphonation in each of (a) and (b) is on average in the range of 0.7 to 2.

4. A compound (e) or mixture thereof according to claim 1, wherein the molar ratio of formaldehyde to $[(a)+]$ employed is in the range of 0.25:1 to 1.1:1.

5. A compound (e) or mixture thereof according to claim 1 containing one or more repeating units of the respective average formula

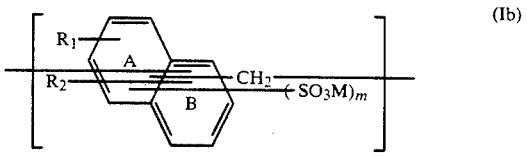

and/or

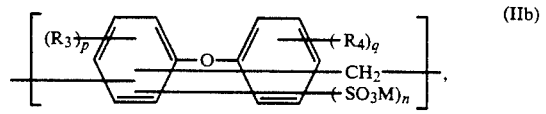

wherein each of m and n independently is a number form 0.7 to 2 and M signifies hydrogen or a cation.

6. A compound (e) or mixture thereof according to claim 1 in the form of a slat ($e_1$) at least partially metallized with a transition metal or mixture thereof of the fourth period of the periodic system of elements, which metal is capable of complex formation.

7. A dyestuff dispersion or mixture thereof comprising (d) at least one disperse dye and (e) at least one product according to claim 1 and optionally (f) at least one non-ionic levelling and/or dispersing agent and/or (g) at least one further anion-active levelling and/or dispersing agent different from (e).

8. A mixture of (e) a methylene bridge- and sulpho group containing aromatic compound or mixture of compounds according to claim 1 with (f) at least one non-ionic levelling and/or dispersing agent, and/or (g) at least one further anion-active leveling and/or dispersing agent different from (e).

9. A compound (e) or mixture thereof according to claim 2 wherein the degree of sulphonation in each of (a) and (b) is, on average, in the range of 0.7 to 2 and the molar ratio of formaldehyde to [(a)+(b)] employed is in the range of 0.25:1 to 1.1:1.

10. A compound (e) or mixture thereof according to claim 9 wherein $R_2$ is $C_{1-4}$ alkyl.

11. A compound (e) or mixture thereof according to claim 10 wherein $R_1$ and $R_2$ are, independently, propyl or butyl.

12. A compound (e) or mixture thereof according to claim 11 wherein p is 0 or 1, q is 0 or 1 and $R_3$ and $R_4$ are, independently, methyl or ethyl.

13. A compound (e) or mixture thereof according to claim 12 wherein $R_1$ and $R_2$ are the same and the compound of formulae II is diphenylether or ditolylether.

14. A compound (e) or mixture thereof according to claim 10 wherein (c) is condensed with a mixture of (a) and (b) obtained by sulphonating a mixture of compounds of formulae (I) and (II).

15. A compound (e) or mixture thereof according to claim 10 wherein (c) is condensed with mixture of (a) and (b) obtained by sulphonating compounds of formulae (I) and (II) separately and mixing the resulting sulphonation products together.

16. A compound (e) or mixture thereof according to claim 1 wherein (c) is condensed with a mixture of (a) and (b) obtained by sulphonating compounds of formulae (I) and (II) separately and mixing them together or sulphonating a mixture of compounds of formulae (I) and (II).

17. A compound (e) or mixture thereof according to claim 1 wherein (a) and (b) are, respectively, compounds of the average formulae (Ia) and (IIa)

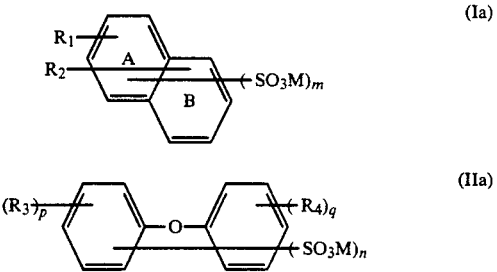

in which m and n, independently, signify 0.7 to 1.2 and

M signifies hydrogen or a cation, the molar ratio (a):(b) employed is in the range 20:80 to 70:30 and 0.35 to 0.8 mole of (c) is employed per mole of [(a)+(b)].

18. A compound (e) or mixture thereof according to claim 17 wherein a mixture of (a) and (b) is condensed with (c) at a temperature in the range 50°–110° C. and a pH less than 3.

19. A compound (e) or mixture thereof according to claim 5 wherein in each of formulae (Ib) and (IIb), the free bond without any substituent and pendant at the aromatic nucleus is either linked over a methylene bridge to a further unit of formula (Ib) or (IIb) or to a hydrogen atom and the free bond pendant at the methylene group is linked to the aromatic nucleus of a further unit of formula (Ib) or (IIb).

20. A compound (e) or mixture thereof according to claim 19 wherein there is not more than one sulpho group at each of the rings A and B of formula (Ib) and at each of the benzene rings of formula (IIb).

21. A compound ($e_1$) or mixture thereof according to claim 8 wherein the transition metal is selected from $Mn^{++}$, $Co^{++}$, $Ni^{++}$, $Cu^{++}$ and mixtures thereof.

22. A composition comprising a compound ($e_1$) or mixtures thereof according to claim 8 and at least one UV-stabilizer.

23. A composition according to claim 34 wherein the transition metal is selected from $Mn^{++}$, $Co^{+'}$, $Ni^{++}$, $cu^{+'}$ and mixtures thereof.

24. In a process wherein a substrate is treated in an aqueous medium containing a hydrophilic interface-active assistant, the improvement wherein a compound (e) or mixture thereof according to claim 1 is used as the interface-active assistant.

25. A process according to claim 24 wherein the substrate is a fibrous substrate and the aqueous medium contains a dye or optical brightener for the substrate and an amount of compound (e) effective as a dispersing and/or leveling agent.

26. A process according to claim 25 which comprises dyeing a fibrous substrate from an aqueous medium with a disperse dye or dyeing leather from an aqueous medium with a hydrosoluble dye.

27. A process according to claim 26 which comprises dyeing a fibrous substrate from an aqueous medium having a disperse dye or mixture thereof dispersed therein in the presence of a compound (e) as a dispersing agent.

28. A process according to claim 24 which comprises tanning leather from an aqueous medium containing compound (e) as a tanning assistant or retanning leather from an aqueous medium containing compound (e) as a tanning assisting or as sole syntan.

29. A process for dyeing a substrate selected from the group consisting of textiles, leather and paper which comprises dyeing said substrate with an anionic dye from an aqueous medium containing, as dyeing assistant, a compound ($e_1$) or mixture thereof according to claim 8.

30. A process for dyeing a substrate selected from the group consisting of textiles, paper and leather which comprises dyeing said substrate from an aqueous medium containing as dyeing assistant, a composition according to claim 22.

31. A process according to claim 24 wherein the aqueous medium further contains a dispersing agent and/or leveling agent different from the compound (e).

32. A substrate whenever treated by a process according to any one of claims 24–31.

33. A compound (e) or mixture thereof according to claim 13 wherein (c) is condensed with a mixture of (a) and (b) obtained by sulphonating a mixture of compounds of formulae (I) and (II).

34. A compound (e) or mixture thereof according to claim 13 wherein (c) is condensed with a mixture of (a) and (b) obtained by sulphonating compounds of formulae (I) and (II) separately and mixing the resulting sulphonation products together.

35. A compound (e) or mixture thereof according to claim 18 wherein $R_1$ and $R_2$ are the same and are propyl or butyl and the compound of formula (IIa) is a product of sulphonating diphenylether or ditolylether.

36. A compound (e) or mixture thereof according to claim 35 obtainable by condensing with (c) a mixture of (a) and (b) prepared by sulphonating a mixture of dipropyl- or dibutylnaphthalene and diphenylether or ditolylether.

37. A process for producing a methylene bridge and sulpho group-containing aromatic compound (e) or mixture of compounds (e) which comprises condensing
(a) a sulphonation product of a compound of formula

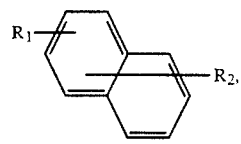
(I)

wherein
$R_1$ signifies $C_{1-4}$-alkyl and
$R_2$ signifies hydrogen or $C_{1-4}$-alkyl
and the sum of the number of carbon atoms in $R_1$ and $R_2$ together amounts to a least 2 or a mixture thereof
and
(b) a sulphonation product of a compound of formula

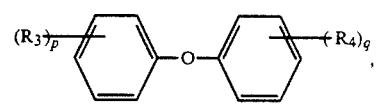
(II)

wherein
each of $R_3$ and $R_4$ independently signifies $C_{1-4}$-alkyl and
each p and q independently signifies 0,1 or 2
or a mixture thereof with
(c) formaldehyde or a formaldehyde-yielding compound in an acidic medium and optionally forming a salt.

* * * * *